United States Patent
Tadino et al.

(10) Patent No.: US 9,777,868 B2
(45) Date of Patent: Oct. 3, 2017

(54) COMPRESSED-AIR DEVICE FOR CONTROLLING VALVES

(75) Inventors: Vincent Luc Antoine Tadino, Chastres (BE); Guillaume André René Villeret, Saint Julien en Genevois (FR)

(73) Assignee: Out and Out Chemistry SPRL, Charleroi (BE)

( * ) Notice: Subject to any disclaimer, the term of this patent is extended or adjusted under 35 U.S.C. 154(b) by 394 days.

(21) Appl. No.: 14/380,848

(22) PCT Filed: Feb. 28, 2012

(86) PCT No.: PCT/EP2012/053364
§ 371 (c)(1),
(2), (4) Date: Oct. 28, 2014

(87) PCT Pub. No.: WO2013/127439
PCT Pub. Date: Sep. 6, 2013

(65) Prior Publication Data
US 2015/0086431 A1    Mar. 26, 2015

(51) Int. Cl.
| F01C 9/00 | (2006.01) |
| F16K 31/16 | (2006.01) |
| F15B 11/12 | (2006.01) |
| F15B 15/12 | (2006.01) |
| B01J 4/00 | (2006.01) |

(52) U.S. Cl.
CPC .............. *F16K 31/16* (2013.01); *B01J 4/008* (2013.01); *F15B 11/123* (2013.01); *F15B 15/12* (2013.01)

(58) Field of Classification Search
CPC ................................ F16K 31/16; B01J 14/008

USPC .......................................................... 92/121
See application file for complete search history.

(56) References Cited

U.S. PATENT DOCUMENTS

| 2,911,956 A | 11/1959 | Smith, Jr. | |
| 4,105,556 A * | 8/1978 | D'Amaddio | B01D 61/08 210/206 |
| 2002/0096044 A1* | 7/2002 | Raikamo | F15B 15/12 92/122 |
| 2008/0093575 A1* | 4/2008 | Church | F16K 5/0605 251/315.16 |

FOREIGN PATENT DOCUMENTS

| DE | 3925887 A1 | 2/1991 |
| DE | 19756425 A1 | 9/1998 |
| FR | 1416183 A | 10/1965 |
| JP | 08-074809 A | 3/1996 |
| WO | WO 01/12996 A1 | 2/2001 |

* cited by examiner

*Primary Examiner* — Michael Leslie
*Assistant Examiner* — Daniel Collins
(74) *Attorney, Agent, or Firm* — Reinhart Boerner Van Deuren P.C.

(57) ABSTRACT

The invention relates to a compressed-air device for controlling valves comprising, in a longitudinal direction, a first vane-type rotary cylinder (1) having a front face (2) as well as a back face (4), said front face (2) being provided with a rotatable head (3), and a second vane-type rotary cylinder (10) having a front face (11) and a back face, said first (1) and second (10) cylinders each being supplied with compressed air by means of a compressed air valve connected to two ports (7, 8; 14, 15) on each of said first and second cylinders.

7 Claims, 6 Drawing Sheets

COMPRESSED-AIR DEVICE FOR CONTROLLING VALVES

The present invention relates to a compressed-air device for controlling valves.

Devices for controlling valves are known from the state of the art.

For example, document DE 19756425 describes a compressed-air valve actuator based on the use of a single compressed-air cylinder comprising a compressed-air inlet, a piston and return springs ensuring the return of the piston to its initial position when the pressure exerted on the piston is removed. When the piston performs a movement after it is pressurized, a rotating shaft, one end of which is connected to a valve to be controlled, is set in motion, which makes it possible to rotate said valve to be controlled by an angle limited to 90°.

Documents DE 3925887 and JP 8074809 disclose dual-action pneumatic actuators for controlling valves. These valve actuators are made up of two cylinders positioned on either side of a rotatable head connected to said valve to be controlled. Each cylinder comprises a piston and return springs, the two cylinders being supplied with compressed air via a same inlet. When the two cylinders are actuated simultaneously, they drive the rotation of a rotating shaft by a first angle of 90°, one end of said shaft connected to said valve to be controlled.

Unfortunately, such compressed-air valve actuators only rotate in one direction, which greatly limits the applications related to their use. Additionally, the existing valve systems are bulky and often include electronic components which, if placed near corrosive, radioactive or moist environments, do not hold up. To avoid these problems, the electronic components, such as sensors, should be protected, for example by shielding, which has the drawback of increasing the size of the valve actuators. Furthermore, the compressed air for each of the cylinders is generally supplied by more than two compressed-air valves, which requires the implementation of a logic sequence in the valve controller.

The invention aims to offset the drawbacks of the state of the art by procuring a compressed-air device for controlling valves that is not sensitive to corrosive, radioactive or moist environments, is compact, and allows rotation in both directions, in a single motion without having to stop in an intermediate position.

Thus, in order to resolve these problems, according to the invention, a device is provided as indicated above, characterized in that it comprises, in a longitudinal direction, a first vane-type rotary cylinder having a front face as well as a back face, said front face being provided with a rotatable head, and a second vane-type rotary cylinder having a front face and a back face, said first and second cylinders each being supplied with compressed air by means of a compressed air valve connected to two ports on each of said first and second cylinders, said first vane-type rotary cylinder being arranged to rotate said valve to be controlled between a first predetermined position and a second predetermined position in a single motion, said back face of said first cylinder comprising a rotating disc provided with stationary edges, said second cylinder being arranged to describe an angle from a first predetermined position to a second predetermined position in a single motion and comprising, on its front face, a rotating disc provided with a stop, said second cylinder further having a torque greater than that of said first cylinder, and said first and second cylinders being connected to each other by mutual interlocking, said stop of said rotary disc of said second cylinder being arranged to be inserted between said stationary edges of said first cylinder and further having a width arranged to allow the stationary edges of said rotary disc of said first cylinder to perform a predetermined rotation before being blocked by said stop.

"Vane-type rotary cylinder", within the meaning of the present invention, refers to a cylinder made up of a tight cylinder chamber (the body of the cylinder) containing a stop secured to the body as well as an axis on which a vane is fastened which, in association with said stop, divides said cylindrical chamber into a first and second tight compartment. Each of said two tight compartments is provided with a port arranged to allow compressed air to enter and exit. Depending on whether the compressed air is injected into one or the other of said two tight compartments, the pressure exerted on said vane will drive a right or left rotation of the axle on which said vane is fastened. When compressed air is injected into said first tight compartment, the air contained in said second tight compartment is evacuated, and vice versa.

Such a device according to the invention advantageously makes it possible to minimize the bulk of the valve actuators, since the cylinders are placed longitudinally behind one another. Furthermore, the vane-type rotary cylinders supplied with compressed air do not have electronic components and are therefore suitable for being placed in corrosive and/or radioactive environments without requiring bulky shielding. Unlike the valve actuators described in the state of the art, the device for controlling valves according to the invention allows rotation in both directions from a first predetermined position to a second predetermined position of said valve to be controlled, in a single movement without having to stop at an intermediate position.

This rotation in both directions is obtained by imposing a torque difference between said first cylinder and said second cylinder, which are connected to each other by mutual interlocking by means of stationary edges present on the rotary disc of the first cylinder and a stop on the rotary disc of said second cylinder, the width of said stop being arranged to allow the stationary edges to perform a predetermined rotation before blocking them. Furthermore, the torque difference allows the second cylinder, which has a higher torque, to drive or block said first cylinder having the lower torque, in order to reach a desired position, said stop of said rotary disc of said second cylinder blocking or driving said stationary edges of said rotary disc of said first cylinder. Preferably, according to the present invention, said first vane-type rotary cylinder is arranged to rotate said valve to be controlled by a 180° angle in a single motion. This is particularly advantageous, since it is not necessary to stop in an intermediate position during a 180° rotation and the rotation of said valve to be controlled is not limited to a 90° angle.

Advantageously, according to the present invention, said first vane-type rotary cylinder can stop in a predetermined intermediate position comprised between said first predetermined position and said second predetermined position of said valve to be controlled. It is thus possible to control the valve so that it rotates and stops in any predetermined position depending on the torque difference imposed between the two vane-type rotary cylinders, depending on the position of said stationary stops of said rotary disc of said first cylinder and depending on the width of said stop of the rotary disc of said second cylinder, which allows the stationary edges of the rotary disc of said first cylinder to perform a predetermined rotation before being blocked by said stop.

Preferably, according to the present invention, said intermediate position of said first cylinder is reached following a rotation from a position at 0° to a position at 90° or from a position at −90° to a position at 0°, in a conventional trigonometric reference.

Preferably, according to the present invention, said second cylinder has a torque two times greater than that of said first cylinder. This allows the second cylinder to drive or block said first cylinder depending on the position to be reached by said valve to be controlled, said stop of said rotary disc of said second cylinder blocking or driving said stationary edges of said rotary disc of said first cylinder.

Preferably, said rotary disc of said first cylinder has two diametrically opposite stationary edges, while said rotary disc of said second cylinder has a median rectangular stop. Such an arrangement of each of the rotary discs of said first and second cylinders allows the mutual interlocking, the movements of the two cylinders thus being interdependent. In fact, not only the torque between said first and second cylinders, but also this special mutual interlocking, allows the device according to the invention to control said valve by causing it to perform rotations in both directions and by stopping it in precise predetermined positions.

Advantageously, said median rectangular stop of said rotary disc of said second cylinder has a width allowing the stationary edges of said rotary disc of said first cylinder to perform a rotation by a 90° angle before being blocked by said median rectangular stop.

Preferably, said rotary discs of said first and second cylinders are surrounded by an enclosure or a protective mask. This makes it possible to prevent small elements, for example dust particles, from building up between said rotary discs, which could prevent said rotary discs from rotating correctly.

In one particular embodiment according to the invention, the compressed-air device for controlling valves is characterized in that:

said first vane-type rotary cylinder is arranged to rotate said valve to be controlled by an angle of 180°,
said second cylinder is arranged to describe a 90° angle, said second cylinder also having a torque two times greater than that of said first cylinder,
said stationary edges of said rotary disc of said first cylinder are diametrically opposite, and
said stop of said rotary disc of said second cylinder is a median rectangular stop whereof the width allows the stationary edges of said rotary disc of said first cylinder to rotate by an angle of 90° before being blocked by said median rectangular stop.

According to this particular embodiment, the compressed-air device for controlling valves according to the invention makes it possible to control said valve by being able to cause it to perform rotations in a single motion and without having to stop in intermediate position: from a position at −90° to a position at 0°, from a position at 0° to a position at 90°, from a position at 0° to a position at −90°, from a position at 90° to a position at 0°, from a position at −90° to a position at 90°, and from a position at 90° to a position at −90°.

Other embodiments of the compressed-air device for controlling valves according to the invention are indicated in the attached claims.

The invention also relates to a device for controlling the flow of a fluid in a pipe, comprising at least one valve located in said pipe to control said flow of said fluid in said pipe, and at least one compressed-air device for controlling valves, each compressed-air device for controlling valves respectively being able to be associated with a valve located in said pipe.

Advantageously, said pipe is a single-use cartridge comprising at least one valve being arranged to be fastened to said rotatable head of said first cylinder of a compressed-air device for controlling valves according to the invention.

The term "cartridge", within the meaning of the present invention, means a pipe where a fluid can flow and that is provided with a series of valves dividing said pipe into a series of sections, said valves allowing or prohibiting, depending on the position, the fluid from going from one section to another in said pipe, each valve further being able to direct said fluid toward an element arranged to treat that fluid, for example a chromatography column, said element for treating said fluid being placed perpendicular relative to the axis defined by said pipe or being placed at one of the ends of said pipe.

"Single-use cartridge", within the meaning of the present invention, refers to a cartridge as previously described and which can be reused several times on the condition that it undergoes a cleaning and reconditioning sequence between two successive uses.

Preferably, the fastening of said valve to the rotatable head of said first cylinder is done using a connecting element secured to the rotatable head of said first cylinder and arranged to interlock on said valve to be controlled.

Other embodiments of the device for controlling the flow of a fluid in a pipe according to the invention are indicated in the appended claims.

Another aim of the present invention relates to a synthesis or purification machine for radioactive compounds arranged to receive a single-use cartridge and comprising a control unit controlling the rotation of the valves from a first predetermined position to a second predetermined position, characterized in that it comprises at least one compressed-air device for controlling valves as previously described.

The synthesis or purification of radioactive compounds is done in devices that make it possible to place the various chemical compounds in contact intended to perform one or more of the following steps: purification of the radioisotope, conditioning thereof to prepare it for the marking step, marking with the possibility of heating, pre-purification, purification of the obtained products and their final formulation.

Radioelement synthesis machines based on the use of cartridges comprising valves controlled by means of a control unit are known. For example, this type of machine pertains to the synthesis of various compounds (non-exhaustive list), for example [$^{18}$F]FLT, [$^{18}$F]FMiso, [$^{18}$F]FET, [$^{18}$F]FAcetate, [$^{18}$F]FES, [$^{18}$F]SFB, [$^{18}$F]FDGal, [$^{18}$F]Fcholine and, the most common, [$^{18}$F]FDG or 2-[$^{18}$F]fluoro-2-deoxy-D-glucose, based on the following steps: preparation of the fluorination agent, marking of the precursor, pre-purification, basic medium hydrolysis and placement in an injectable solution. These steps require the addition of reagents at precise moments and a transfer of the solutions obtained during each step to an area where the next step can take place. Using single-use cartridges having a pipe comprising a series of valves spaced apart in a standard manner makes it possible to direct the pressurized fluid by acting on the opening and closing of valves, which makes it possible to add the reagents at a precise moment during the production method and to guide said fluid from a first section of said pipe to a second section by causing it to pass, or not pass, through one or more of the elements arranged to treat said fluid, said first and second sections being separated at least by a valve.

The radioactive element synthesis or purification machine according to the invention advantageously makes it possible to optimize the manufacturing method not only by allowing the valves of the disposable cartridges to rotate in both directions, but also by minimizing the size of the valve actuators. This is particularly advantageous, since the size of the machines can be reduced, which also makes it possible to minimize the size of the shielded protective environments, which are expensive. Furthermore, since the valves allow the fluid to flow in both directions, i.e., to the right or the left, the radioactive element synthesis machine according to the invention makes it possible to multiply the possible applications.

Preferably, said valves spaced apart in a standard manner are positioned in said pipe at a distance comprised between 2 and 5 cm, preferably at a distance of 3 cm. According to the invention, the diameter of said cylinders is less than or equal to 5 cm, preferably 3 cm, such that a series of compressed-air devices for controlling valves can be positioned in an adjacent manner, in parallel, each compressed-air device controlling a valve of said pipe.

Other embodiments of the radioactive component synthesis or purification machine according to the invention are indicated in the appended claims.

Other features, details and advantages of the invention will emerge from the following description, provided non-limitingly and in reference to the appended drawings.

In the figures, identical or similar elements bear the same references.

Figure 1:
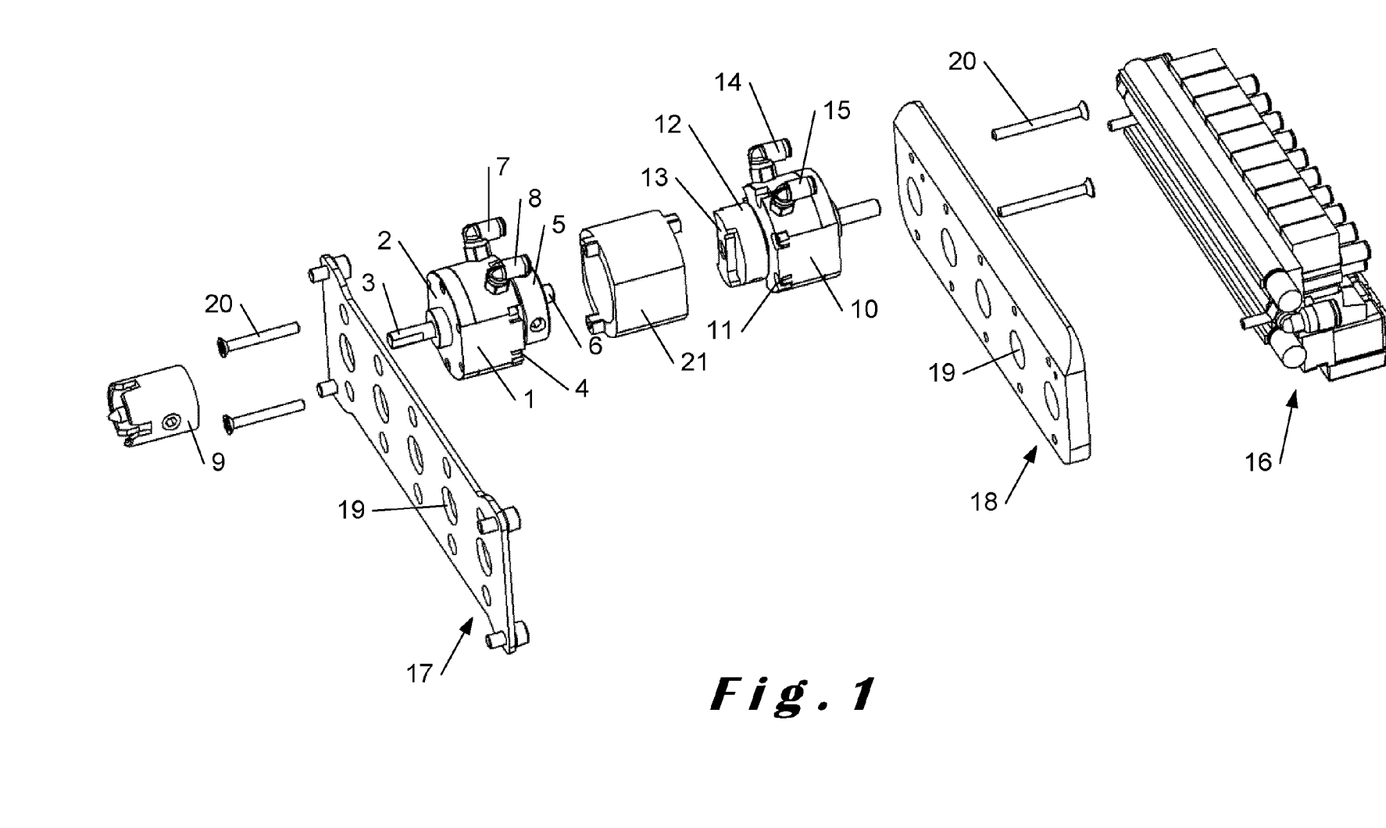
FIG. 1 illustrates the compressed-air device for controlling valves.

FIG. 1 illustrates the compressed-air device for controlling valves according to the invention. The first vane-type rotary cylinder (1) has a front face (2) that is provided with a rotatable head (3) secured to the axle on which the vane is fastened inside said rotating cylinder (1).

The first vane-type rotary cylinder (1) further comprises, on its back face (4), a rotating disc (5) also secured to the axle to which the vane is fastened inside said rotating cylinder (1), said rotating disc (5) being provided with two stationary edges (6). The first vane-type rotary cylinder (1) is also provided with two ports (7, 8) each allowing the entry and exit of compressed air that is provided by means of a compressed-air valve system (16).

Each port (7, 8) communicates with one of the two tight compartments inside said rotary cylinder (1), and said compartments are separated by said vane and by an inner stop in said cylinder (1) against which said vane is blocked.

Depending on whether the compressed air is injected into one or the other of said two tight compartments by means of one of said ports (7, 8), said vane will be pushed either to the right or to the left and will rotate said rotary disc (5) and said rotatable head (3) to the right or the left. Said rotatable head (3) of said first cylinder (1) is connected to a connecting element (9) that is arranged to interlock on said valve to be controlled.

The second cylinder (10) has a front face (11) comprising a rotary disc (12). The rotary disc (12) is secured to the axle to which the vane is fastened inside said rotary cylinder (10) and is provided with a median rectangular stop (13), the width of which allows both stationary edges (6) of said rotary disc (5) of said first cylinder (1) to perform a predetermined rotation before blocking them. The second vane-type rotary cylinder (10) is also provided with two ports (14, 15) each allowing the entry and exit of compressed air.

Each port (14, 15) communicates with one of the two tight compartments inside said rotary cylinder (10), and said compartments are separated by said vane and an inner stop in said cylinder (10) against which said vane is blocked.

Depending on whether the compressed air is injected into one or the other of said two tight compartments by means of one of said ports (14, 15), said vane will be pushed either to the right or to the left and will rotate said rotary disc (12) to the right or left.

Said first cylinder (1) and said second cylinder (10) are connected by mutual interlocking. Said stop (13) of said rotary disc (12) of said second cylinder (10) is provided to be inserted between said stationary edges (6) of said first cylinder (1) and further has a width allowing the stationary edges (6, 7) of said rotary disc (5) of said first cylinder (1) to perform a predetermined rotation before being blocked by said stop (13).

The mutual interlocking of the two vane-type rotary cylinders (1, 10) makes their movements interdependent. Depending on the rotation to be performed, and since the second cylinder (10) has a torque greater than that of said first cylinder, the stop (13) of said rotary disc (12) of said second cylinder (10) can rotate said rotary disc (5) of said first cylinder (1) while bearing against said stationary edges (6) or can block said rotary disc (5) of said first cylinder (1) by blocking said stationary edges (6) present on said rotary disc (5) of said first cylinder (1).

Depending on the rotational movements imposed on each of said first and second cylinders (1, 10) by the compressed air in one or the other of said two tight compartments of each of said cylinders, the valve to be controlled will be rotated from a first position to a second position by an angle defined by the torque difference between said two cylinders (1, 10), by the width of said stop (13) of said rotary disc (12) of said second cylinder (10), and by the position of said stationary edges (6) of said rotary disc (5) of said first cylinder (1).

Plates (17, 18) having orifices (19) ensure the maintenance and support of the compressed-air device for controlling valves, and screws (20) allow said first and second cylinders (1, 10) to be fastened to these plates (17, 18). Furthermore, a protective mask (21) is provided to surround said rotary discs of said first and second cylinders (1, 10) in order to avoid any dirtying.

Figure 2:
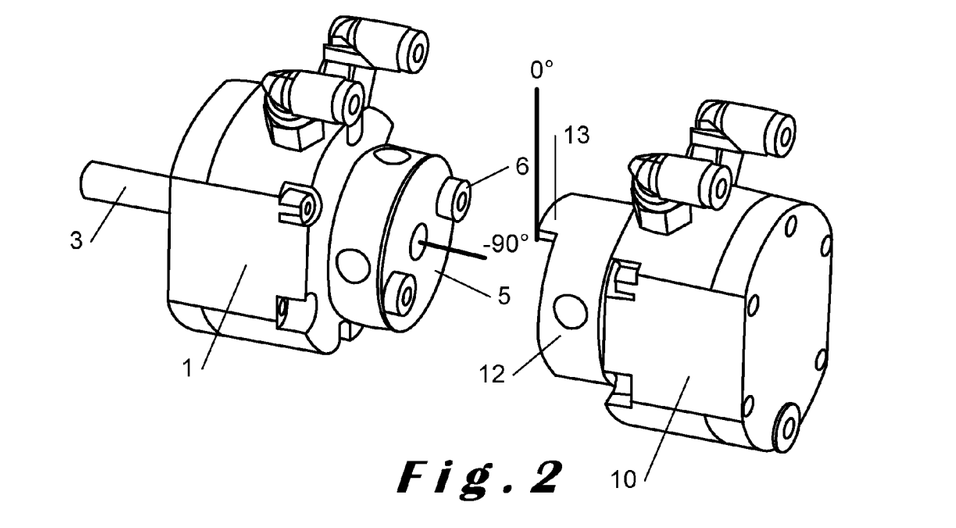
FIG. 2 illustrates the position of each of the cylinders upon assembly when they are not supplied with compressed air.

FIG. 2 illustrates the position of each of the cylinders upon assembly. In this first assembled position and when neither of the two cylinders (1, 10) is supplied with compressed air, said first cylinder (1) is positioned at −90°, while the second cylinder (10) is positioned at 0°.

Figure 3:
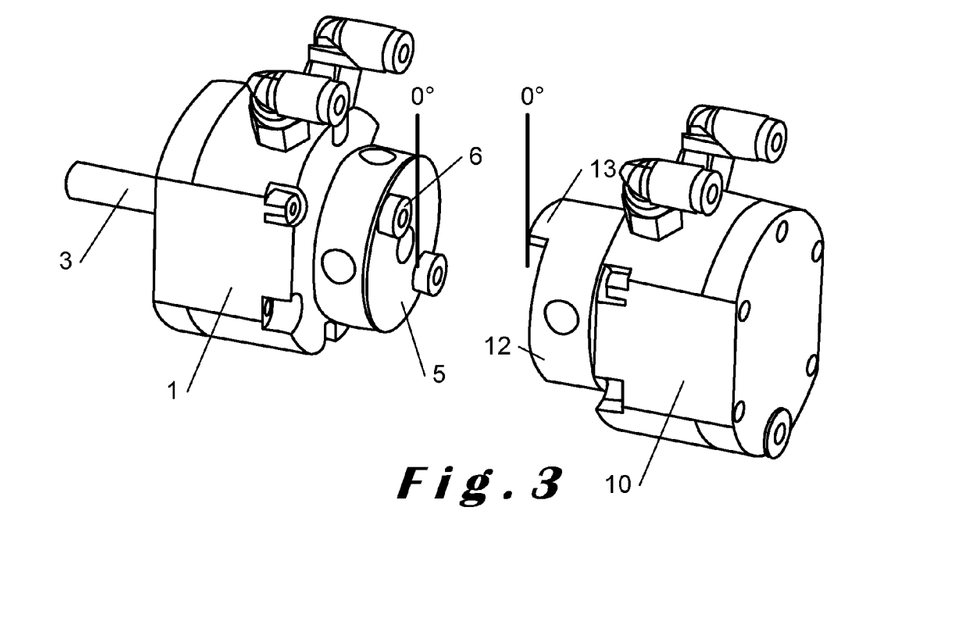
FIG. 3 illustrates the position of each of the cylinders when the system is pressurized.

FIG. 3 illustrates the position of each of the cylinders (1, 10) when the system is pressurized. Following this pressurization, said first and second cylinders (1, 10) are each positioned in their default position defined by the location of the inner stop secured to the body of the cylinder. Thus, said first cylinder (1) performs a rotation from a first position at −90° to a second position at 0°.

In this position at 0°, the stationary edges (6) of said rotary disc (5) of said first cylinder (1) are blocked against said median rectangular stop (13) of said rotary disc (12) of said second cylinder (10), which is positioned at 0° in the assembled position and which has a torque two times greater than that of said first cylinder (1). Thus, following the pressurization of the device, said first (1) and second (10) cylinders are both positioned at 0°.

Figure 4:
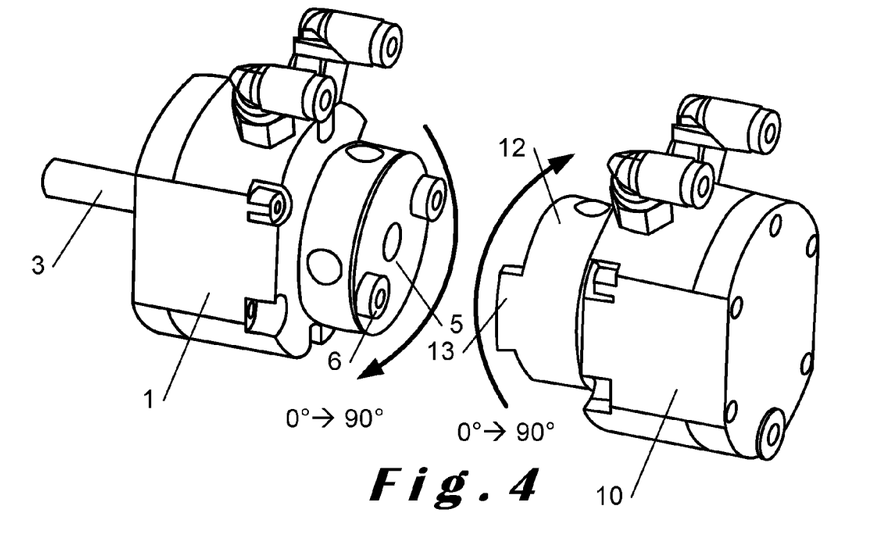
FIG. 4 illustrates the rotational movement of each of the cylinders when said valve to be controlled must perform a rotation from a first position at 0° to a second position at 90°.

FIG. 4 illustrates the rotational movement of each of the cylinders (1, 10) when said valve to be controlled must perform a rotation from a first position at 0° to a second position at 90°. To perform a rotation of said valve to be controlled from a first position at 0°, for example obtained following pressurization of the device, to a second position at 90°, said first cylinder (1) is supplied with compressed air by means of a first compressed-air valve so that said rotating device (5) of said first cylinder (1) performs a rotation to the right from a first position at 0° to a second position at 90°.

In parallel, said second cylinder (10) is supplied with compressed air by means of a second compressed-air valve so that said rotary disc (12) of said second cylinder performs a rotation to the right from a first position at 0° to a second position at 90°. This rotational movement of said second cylinder (10) allows said first cylinder (1) to perform a rotation to the right, said median rectangular stop (13) of said rotary disc of said second cylinder no longer blocking the stationary edges (6, 7) of said rotary disc (5) of said first cylinder (1) at the 0° position.

Figure 5:
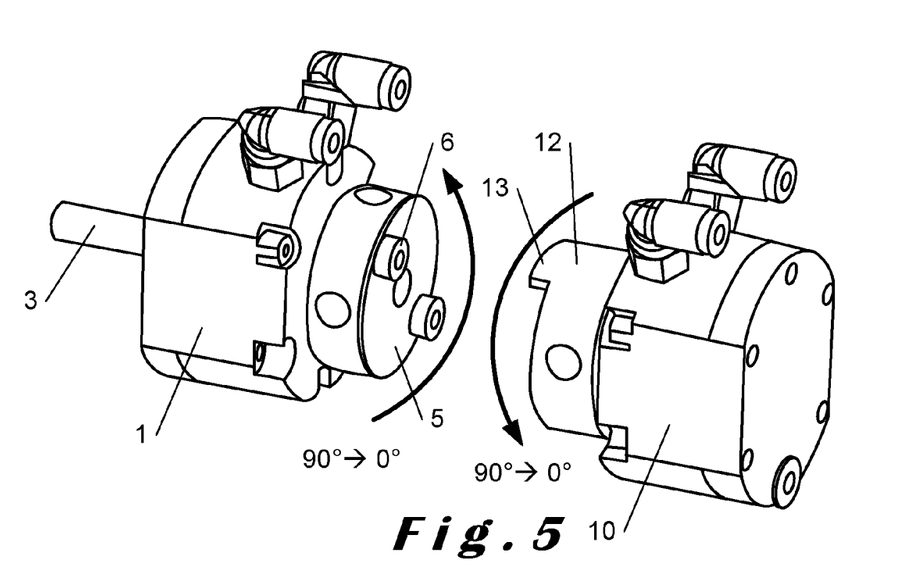
FIG. 5 illustrates the rotational movement of each of the cylinders when said valve to be controlled must perform a rotation from a first position at 90° to a second position at 0°.

FIG. 5 illustrates the rotational movements of each of the cylinders (1, 10) when said valve to be controlled must perform a rotation from a first position at 90° to a second position at 0°. In order to perform a rotation of said valve to be controlled from a first position at 90° to a second position at 0°, said first cylinder (1) is supplied with compressed air by means of a first compressed-air valve so that said rotary disc (5) of said first cylinder (1) performs a rotation to the left from a first position at 90° to a second position at 0°.

In parallel, said second cylinder (10) is supplied with compressed air by means of a second compressed-air valve so that said rotary disc (12) of said second cylinder (10) performs a rotation to the left from a first position at 90° to a second position at 0°. Said second cylinder (10) has a torque two times greater than that of said first cylinder (1), said stationary edges (6) of said rotary disc (5) of said first cylinder (1) are blocked against said median rectangular stop (13) of said rotary disc (12) of said second cylinder (10) that is positioned at 0° following its rotation. Thus, during this movement from a first position at 90° to a second position at 0°, said first cylinder (1) is not only supplied with compressed air, but also pushed by said second cylinder (10) having a torque two times greater.

Figure 6:
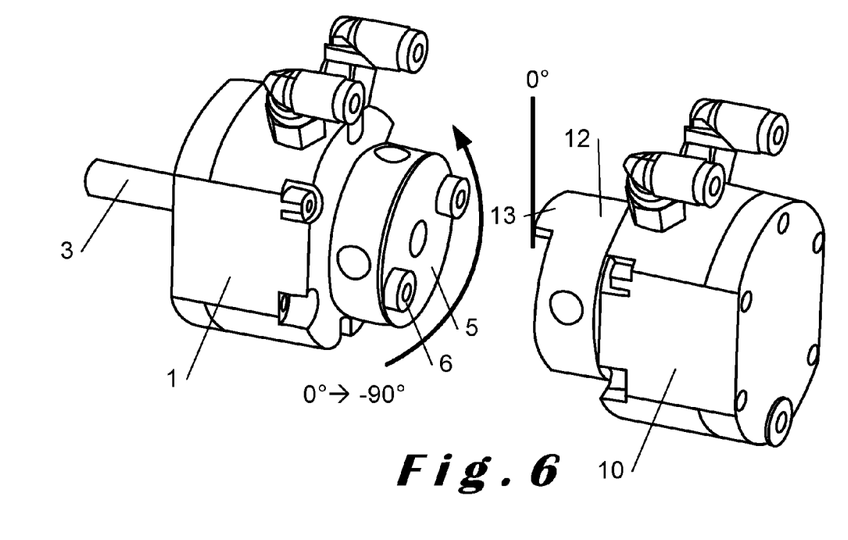
FIG. 6 illustrates the rotational movement of each of the cylinders when said valve to be controlled must perform a rotation from a first position at 0° to a second position at −90°.

FIG. 6 illustrates the rotational movement of each of the cylinders (1, 10) when said valve to be controlled must perform a rotation from a first position at 0° to a second position at −90°. In order to perform a rotation of said valve to be controlled from a first position at 0° to a second position at −90°, said first cylinder (1) is supplied with compressed air by means of a compressed-air valve so that said rotary disc (5) of said first cylinder (1) performs a rotation to the left from a first position at 0° to a second position at −90°.

In parallel, said second cylinder (10) is supplied with compressed air to stay in the 0° position. Only said first cylinder (1) therefore performs a rotation until said stationary edges (6) of said rotary disc (5) of said first cylinder (1) are blocked against said medium rectangular stop (13) of said rotary disc (12) of said second cylinder (10) having twice as much torque as said first cylinder (1) and positioned at 0°.

Figure 7:
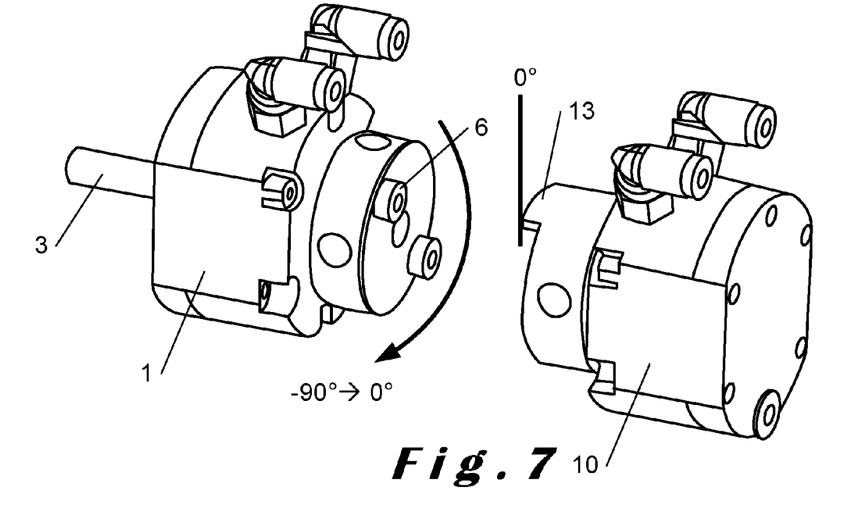
FIG. 7 illustrates the rotational movements of each of the cylinders when said valve to be controlled must perform a rotation from a first position at −90° to a second position at 0°.

FIG. 7 illustrates the rotational movements of each of the cylinders (1, 10) when said valve to be controlled must perform a rotation from a first position at −90° to a second position at 0°. In order to perform a rotation of said valve to be controlled from a first position at −90° to a second position at 0°, said first cylinder (1) is supplied with compressed air by means of a first compressed-air valve so that said rotary disc (5) of said first cylinder (1) performs a rotation to the right from a first position at −90° to a second position at 0°.

In parallel, said second cylinder (10) is supplied with compressed air to stay in the 0° position. Only said first cylinder (1) therefore performs a rotation until said stationary edges (6) of said rotary disc (5) of said first cylinder (1) are blocked against said medium rectangular stop (13) of said rotary disc (12) of said second cylinder (10) having twice as much torque as said first cylinder (1) and positioned at 0°.

Figure 8:
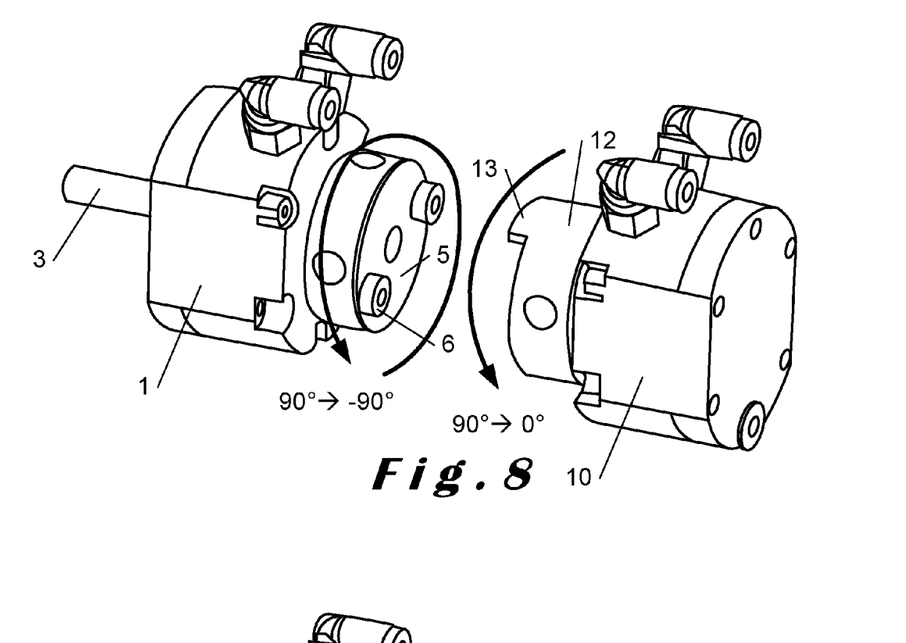
FIG. 8 illustrates the rotational movements of each of the cylinders when said valve to be controlled must perform a rotation from a first position at 90° to a second position at −90°.

FIG. 8 illustrates the rotational movements of each of the cylinders (1, 10) when said valve to be controlled must perform a rotation from a first position at 90° to a second position at −90°. In order to perform a rotation of said valve to be controlled from a first position at 90° to a second position at −90°, said first valve (1) is supplied with compressed air by means of a first compressed-air valve and said second cylinder (10) is supplied with compressed air by means of a second compressed-air valve so that said rotary disc (5) of said first cylinder (1) and said rotary disc (12) of said second cylinder (10) both perform a rotation to the left.

Said second cylinder (10) having a torque twice as high as that of said first cylinder (1), said first cylinder (1) is driven by said second cylinder (10) to the 0° position, but said first cylinder (1) continues its travel to the position at −90°, where said stationary edges (6) of said rotary disc (5) of said first cylinder (1) are blocked against said median rectangular stop (13) of said rotary disc (12) of said second cylinder (10).

Figure 9:
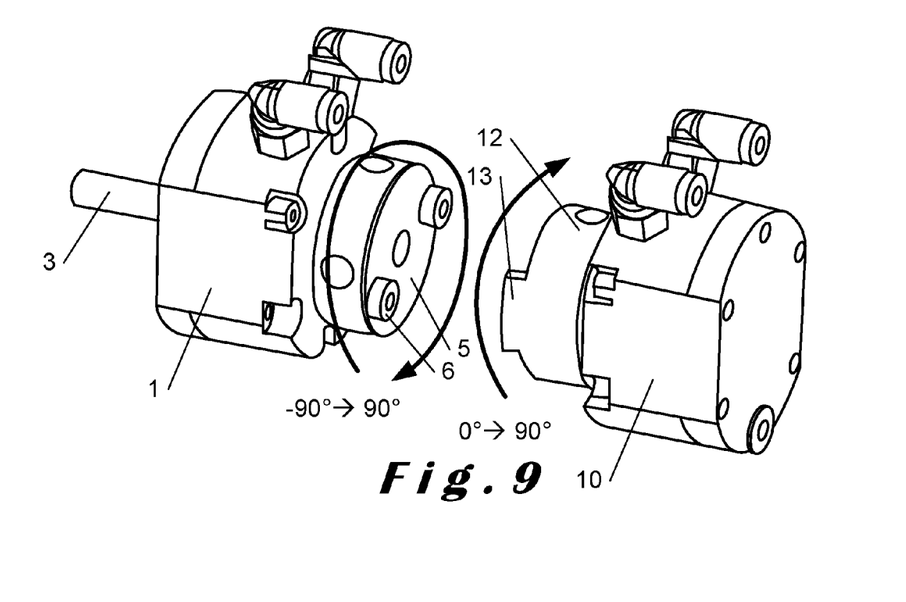
FIG. 9 illustrates the rotational movements of each of the cylinders when said valve to be controlled must perform a rotation from a first position at −90° to a second position at 90°.

FIG. 9 illustrates the rotational movements of each of the cylinders (1, 10) when said valve to be controlled must perform a rotation from a first position at −90° to a second position at 90°. In order to perform a rotation of said valve to be controlled from a first position at −90° to a second position at 90°, said first cylinder (1) is supplied with compressed air by means of a first compressed-air valve and said second cylinder (10) is supplied with compressed air by means of a second compressed-air valve so that said rotary disc (5) of said first cylinder (1) and said rotary disc (12) of said second cylinder (10) both perform a rotation to the right.

A simultaneous supply of said first and second cylinders (1, 10) prevents said first cylinder (1) from being blocked in the 0° position, said first cylinder thus being able to continue its travel to the 90° position.

Figure 10:
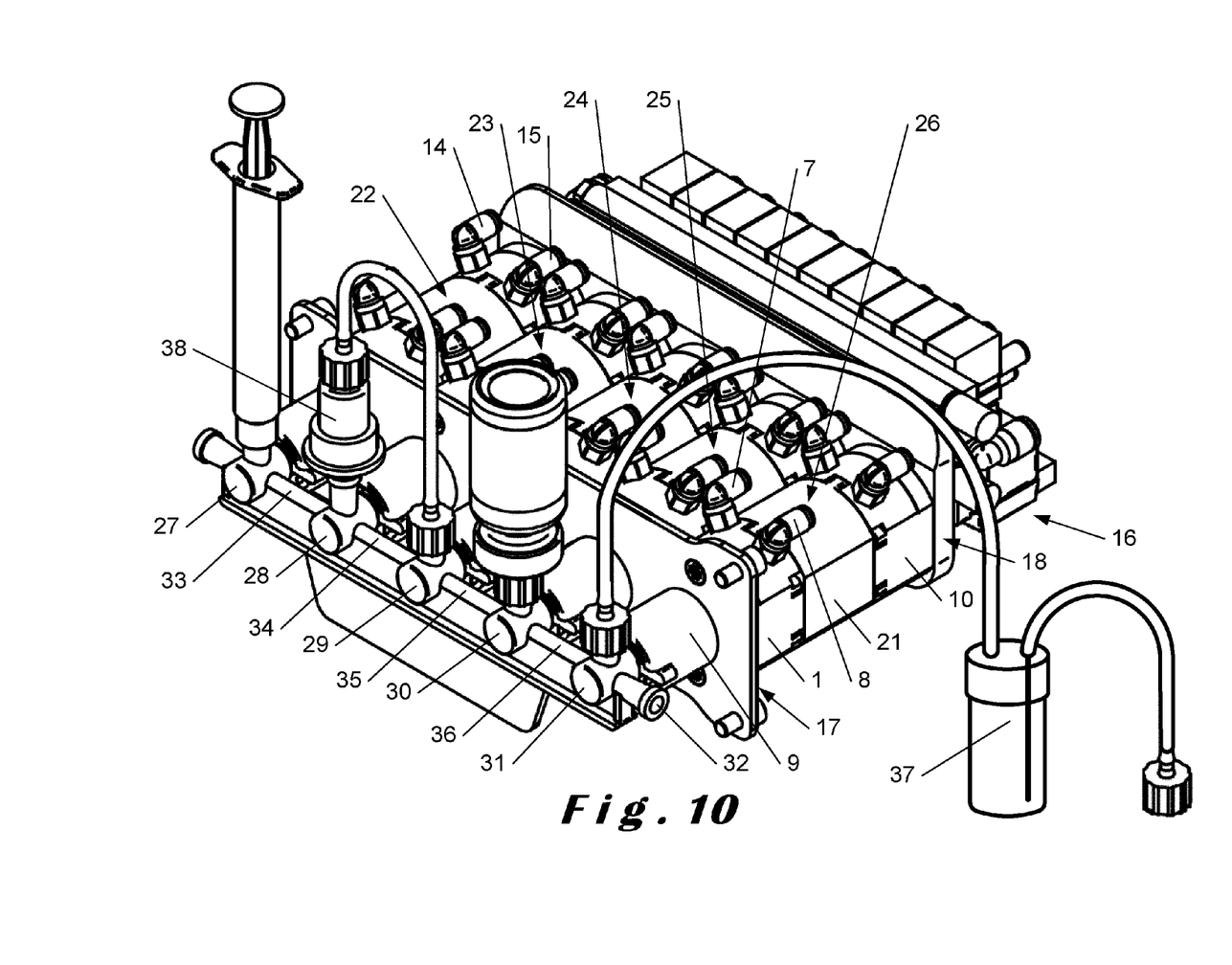
FIG. 10 illustrates an embodiment of the device for controlling the flow of a fluid in a pipe.

FIG. 10 illustrates an embodiment of the device for controlling the flow of a fluid in a pipe according to the invention. According to this embodiment, five compressed air devices for controlling valves (22, 23, 24, 25, 26) are placed in parallel and each connected to a valve to be controlled (27, 28, 29, 30, 31) located in said pipe (31), said valves defining four sections (33, 34, 35, 36), one section being comprised between two successive valves. Each of the compressed-air devices for controlling valves (22, 23, 24, 25, 26) comprises elements as described in FIG. 1. Each valve is therefore controlled individually and can perform rotations in both directions without having to stop in an intermediate position.

According to this embodiment illustrated in FIG. 10, the fluid contained in a reservoir (37) is pressurized to enter said pipe (32) via the valve (31) controlled by the compressed-air device for controlling valves (26), said valve (31) controlling the passage of said fluid in the section (36). Depending on the respective positions of each of the valves (27, 28, 29, 30, 31) that are respectively controlled by the compressed air devices for controlling valves (22, 23, 24, 25, 26), said fluid will be directed from one section to another while passing, or not passing, through elements (38) arranged to treat said fluid. Said valves being able to be rotated in both directions, said fluid can therefore go from a first section to a second section, then go back toward said first section if necessary.

It is clearly understood that the present invention is in no way limited to the embodiments described above, and that changes may be made thereto without going beyond the scope of the appended claims.

For example, other embodiments of the present invention may include a juxtaposed assembly of 2, 3, 4, 5, 6, 7, 8 compressed-air devices for controlling valves, or an infinite number of compressed-air devices for controlling valves.

For example, the compressed-air device for controlling valves, the device for controlling the flow of a fluid in a pipe and the synthesis or purification machine according to the invention can be used in cold chemistry, in biotechnology fields, for protein purification, cell culture, etc. In particular, when the use of pipes with multiple valves (manifold, for example the 3-way Stopcock® marketed by the company Medex) is required in a controlled manner, the present invention is of considerable interest.

The invention claimed is:

1. A compressed-air device for controlling valves, comprising:
   in a longitudinal direction, a first vane-type rotary cylinder having a front face as well as a back face, said front face being provided with a rotatable head, and a second vane-type rotary cylinder having a front face and a back face, said first and second cylinders each being supplied with compressed air by means of a compressed air valve connected to two ports on each of said first and second cylinders,
   said first vane-type rotary cylinder being arranged to rotate said valve to be controlled between a first predetermined position and a second predetermined position in a single motion, said back face of said first cylinder comprising a rotating disc provided with stationary edges,
   said second cylinder being arranged to describe an angle from a first predetermined position to a second predetermined position in a single motion and comprising, on its front face, a rotating disc provided with a stop, said second cylinder further having a torque greater than that of said first cylinder,
   said first and second cylinders being connected to each other by mutual interlocking, said stop of said rotary disc of said second cylinder being arranged to be inserted between said stationary edges of said first cylinder and further having a width arranged to allow the stationary edges of said rotary disc of said first cylinder to perform a predetermined rotation before being blocked by said stop, and
   wherein said first vane-type rotary cylinder is arranged to stop in a predetermined intermediate position comprised between said first predetermined position and said second predetermined position of said valve to be controlled.

2. The compressed-air device for controlling valves according to claim 1, wherein said intermediate position of said first cylinder is reached following a rotation from a position at 90° to a position at 0° or from a position at −90° to a position at 0°.

3. A compressed-air device for controlling valves, comprising:
   in a longitudinal direction, a first vane-type rotary cylinder having a front face as well as a back face, said front face being provided with a roatatable head, and a second vane-type rotary cylinder having a front face and a back face, said first and second cylinders each being supplied with compressed air by means of a compressed air valve connected to two ports on each of said first and second cylinders,
   said first vane-type rotary cylinder being arranged to rotate said valve to be controlled between a first predetermined position and a second predetermined position in a single motion, said back face of said first cylinder comprising a rotating disc provided with stationary edges,
   said second cylinder being arranged to describe an angle from a first predetermined position to a second predetermined position in a single motion and comprising, on its front face, a rotating disc provided with a stop, said second cylinder further having a torque greater than that of said first cylinder,
   said first and second cylinders being connected to each other by mutual interlocking, said stop of said rotary disc of said second cylinder being arranged to be inserted between said stationary edges of said first cylinder and further having a width arranged to allow the stationary edges of said rotary disc of said first cylinder to perform a predetermined rotation before being blocked by said stop; and
   wherein said rotary disk of said first cylinder has two diametrically opposite stationary edges.

4. A compressed-air device for controlling valves, comprising:
   in a longitudinal direction, a first vane-type rotary cylinder having a front face as well as a back face, said front face being provided with a rotatable head, and a second vane-type rotary cylinder having a front face and a back face, said first and second cylinders each being supplied with compressed air by means of a compressed air valve connected to two ports on each of said first and second cylinders, said first vane-type rotary cylinder being arranged to rotate said valve to be controlled between a first predetermined position and a second predetermined position in a single motion, said back face of said first cylinder comprising a rotating disc provided with stationary edges, said second cylinder being arranged to describe an angle from a first predetermined position to a second predetermined position in a single motion and comprising, on its front face, a rotating disc provided with a stop, said second cylinder further having a torque greater than that of said first cylinder, said first and second cylinders being connected to each other by mutual interlocking, said stop of said rotary disc of said second cylinder being arranged to be inserted between said stationary edges of said first cylinder and further having a width arranged to allow the stationary edges of said rotary disc of said first cylinder to perform a predetermined rotation before being blocked by said stop; and wherein said stop of said rotary disc of said second cylinder has a median rectangular stop.

5. The compressed-air device for controlling valves according to claim 4, wherein said median rectangular stop has a width allowing the stationary edges of said rotary disc of said first cylinder to perform a rotation by a 90° angle before being blocked by said median rectangular stop.

6. A compressed-air device for controlling valves, comprising:

in a longitudinal direction, a first vane-type rotary cylinder having a front face as well as a back face, said front face being provided with a rotatable head, and a second vane-type rotary cylinder having a front face and a back face, said first and second cylinders each being supplied with compressed air by means of a compressed air valve connected to two ports on each of said first and second cylinders, said first vane-type rotary cylinder being arranged to rotate said valve to be controlled between a first predetermined position and a second predetermined position in a single motion, said back face of said first cylinder comprising a rotating disc provided with stationary edges, said second cylinder being arranged to describe an angle from a first predetermined position to a second predetermined position in a single motion and comprising, on its front face, a rotating disc provided with a stop, said second cylinder further having a torque greater than that of said first cylinder, said first and second cylinders being connected to each other by mutual interlocking, said stop of said rotary disc of said second cylinder being arranged to be inserted between said stationary edges of said first cylinder and further having a width arranged to allow the stationary edges of said rotary disc of said first cylinder to perform a predetermined rotation before being blocked by said stop; and wherein said rotary disks of said first and second cylinders are surrounded by an enclosure or a protective mask.

7. A device for controlling the flow of a fluid in a pipe, comprising:

at least one valve located in said pipe to control said flow of said fluid in said pipe, at least one compressed-air device for controlling valves, each compressed-air device for controlling valves respectively being able to be associated with a valve located in said pipe, each compressed-air device for controlling valves including:

in a longitudinal direction, a first vane-type rotary cylinder having a front face as well as a back face, said front face being provided with a rotatable head, and a second vane-type rotary cylinder having a front face and a back face, said first and second cylinders each being supplied with compressed air by means of a compressed air valve connected to two ports on each of said first and second cylinders, said first vane-type rotary cylinder being arranged to rotate said valve to be controlled between a first predetermined position and a second predetermined position in a single motion, said back face of said first cylinder comprising a rotating disc provided with stationary edges, said second cylinder being arranged to describe an angle from a first predetermined position to a second predetermined position in a single motion and comprising, on its front face, a rotating disc provided with a stop, said second cylinder further having a torque greater than that of said first cylinder, said first and second cylinders being connected to each other by mutual interlocking, said stop of said rotary disc of said second cylinder being arranged to be inserted between said stationary edges of said first cylinder and further having a width arranged to allow the stationary edges of said rotary disc of said first cylinder to perform a redetermined rotation before being blocked by said stop;

wherein said pipe is a pipe with a single-use cartridge;

wherein said single-use cartridge comprises at least one valve, said at least one valve being arranged to be fastened to said rotatable head of said first cylinder of a compressed-air per QS device for controlling valves, wherein the fastening of said valve to the rotatable head of said first cylinder is done using a connecting element secured to the rotatable head of said first cylinder and arranged to interlock on said valve to be controlled.

* * * * *

UNITED STATES PATENT AND TRADEMARK OFFICE
CERTIFICATE OF CORRECTION

PATENT NO. : 9,777,868 B2
APPLICATION NO. : 14/380848
DATED : October 3, 2017
INVENTOR(S) : Vincent Luc Antoine Tadino et al.

It is certified that error appears in the above-identified patent and that said Letters Patent is hereby corrected as shown below:

In the Claims

Column 12, Claim 7, Line 49 incorrectly reads, "a compressed-air per QS device for" and should correctly read --a compressed-air device for--

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*